United States Patent [19]

Shoup

[11] Patent Number: 5,154,646

[45] Date of Patent: Oct. 13, 1992

[54] BATTERY CLAMP

[76] Inventor: Kenneth E. Shoup, P.O. Box 121, Bonfield, Ill. 60913

[21] Appl. No.: 790,817

[22] Filed: Nov. 12, 1991

[51] Int. Cl.$^5$ .............................................. H01R 4/50
[52] U.S. Cl. ................................ 439/772; 439/765; 439/502
[58] Field of Search ............... 439/765, 768, 770, 772, 439/863, 502, 504

[56] References Cited

U.S. PATENT DOCUMENTS 3,587,030  6/1971  Ohnsorg et al. ..................... 439/502

FOREIGN PATENT DOCUMENTS 857091  11/1952  Fed. Rep. of Germany ...... 439/765

Primary Examiner—Paula A. Bradley
Attorney, Agent, or Firm—Emrich & Dithmar

[57] ABSTRACT

A quick connect/disconnect coupler for dry cell batteries including a flexible metal strap of copper, silver or alloys thereof having quick connect/disconnect clamps at each end. Each of the clamps has a base plate with a first aperture defining an inner surface complementary in shape to an electrode post of a dry cell battery and a second aperture intersecting the first aperture. A cylindrical stub shaft having a flat area thereon is rotatably mounted with respect to the base plate and extends into the second aperture. When the flat area of the stub shaft is aligned with the inner surface of the first aperture, the clamp may be easily slipped onto or off of an electrode post of the associated dry cell battery, but when the stub shaft flat is out of alignment with the inner surface of said first aperture the stub shaft contacts the electrode post and forces same into contact with the inner surface of the first aperture to establish good electrical contact between the clamp and the associated electrode.

20 Claims, 2 Drawing Sheets

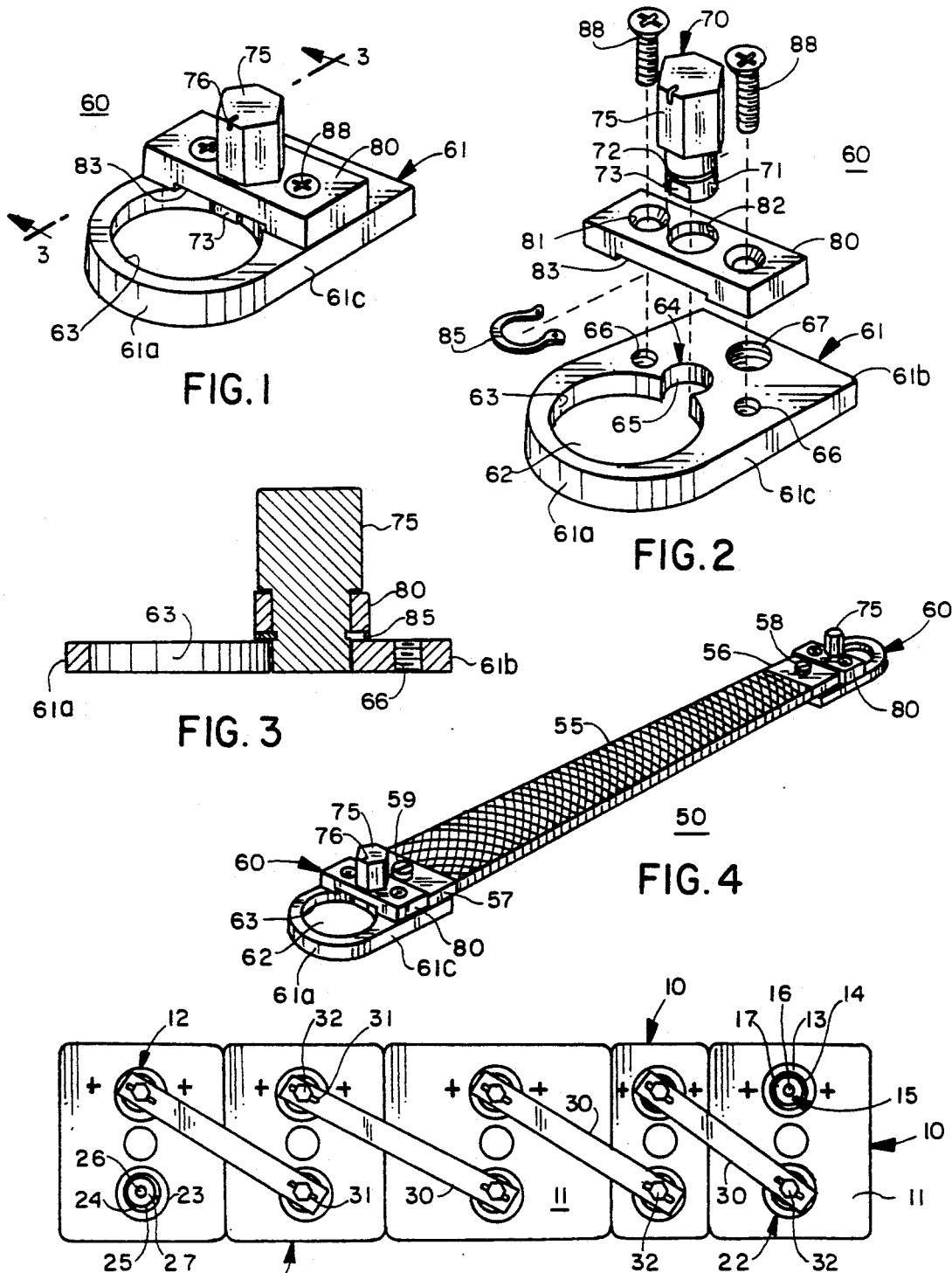

BATTERY CLAMP

BACKGROUND OF THE INVENTION

This invention relates to a quick connect and disconnect mechanism for use with dry cell batteries of the type which are commonly used in remote locations such as to power warning lights at railroad crossings, to power flashing lights in cabooses, to power remote telephone or microwave switching stations and the like.

Normally, the batteries are recharged either by remote charging equipment such as solar powered equipment or at other times by connection to a generator or the like.

When dry cells are charged, they are connected serially by copper straps. Each of the copper straps in the form of flat bars, is provided with slots at each end thereof, and the straps are positioned such that each of the two slots therein is positioned in registry with an electrode of adjacent batteries. Each of the electrodes has a tapped opening in the lead electrode post so that a fastener can be screwed down through the slot in the copper strap and into the lead electrode post of the battery. This prior art arrangement is adequate to provide good electrical contact between the adjacent cells for charging or for accumulating the voltage of several cells during discharge, but the problem is in the time it takes to assemble the various straps, the different size straps required for cells of different dimensions and the real risk of over tightening the fasteners and stripping the threads on the tapped holes in the electrode post. Additional problems exist if the cells or batteries are different heights as well as different in either dimensions.

SUMMARY OF THE INVENTION

Accordingly, it is an object of the present invention to provide a device which obviates the difficulties of the prior art.

Another object of the invention is to provide a rapid coupling mechanism which can connect adjacent cell electrodes wherein tapped fasteners are not required to extend into the electrode post.

Yet another object of the invention is to provide a coupler for adjacent dry cells which accommodates different sized cells so that one universal coupler can be used for a variety of different sized cells.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a clamp which forms a portion of the coupler of the present invention;

FIG. 2 is an exploded view of the clamp illustrated in FIG. 1;

FIG. 3 is a sectional view of the clamp illustrated in FIG. 1 as seen along lines 3—3 thereof;

FIG. 4 is a quick connect/disconnect coupler with a pair of clamps interconnected by a mesh conductor; and FIG. 5 is a top plan view of a plurality of dry cells connected by the copper straps of the prior art.

DESCRIPTION OF THE PREFERRED EMBODIMENT

Figures 6, 7:
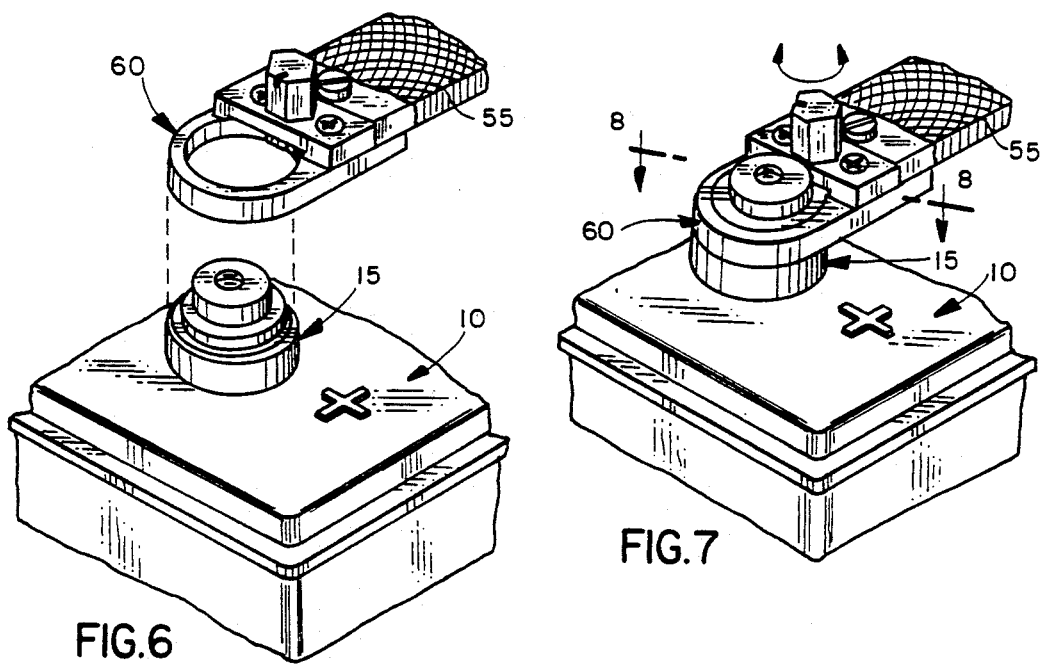
Figures 8, 8A, 11:
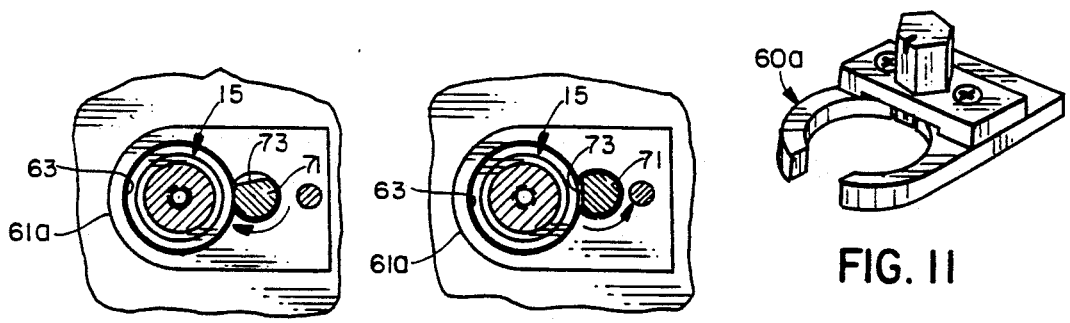
Figure 9:
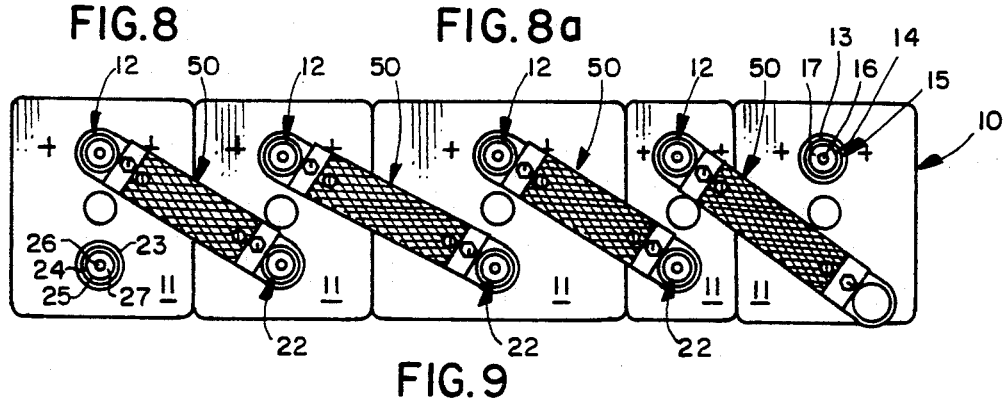
Figure 10:
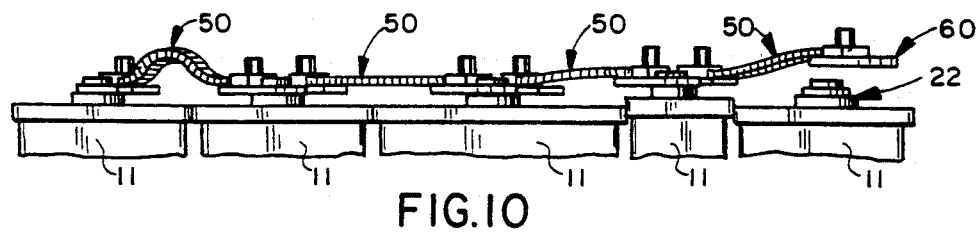

Referring now to FIG. 5, there is disclosed a plurality of dry cell batteries of various sizes, each being provided with a top plate 11 which may be plastic and a positive electrode or cathode 12 with a plastic collar 13 upstanding from the top plate 11 surrounding the electrode. An annular lead cylinder 14 extending upwardly through the collar 13 contains a lead post 15 therein provided with a tapped hole 16 and a top surface 17 which may be of a good electrical conductor, such as copper. As may be seen, each of the batteries 10 has a positive electrode or cathode 12 and a negative electrode or anode 22. The negative electrode or anode 22 extends through a collar 23 in the top plate 11 and includes an annular upstanding lead cylinder 24 having therewithin a lead post 25. The top surface of the lead post 25 has a tapped aperture 26 therein and the top surface 27 of the lead post 25 may be a good electrical conductor such as copper.

The prior art as represented in FIG. 5 includes a plurality of various sized copper straps 30, each of which is provided with a pair of elongated slots 31 at each end thereof, which in use are aligned over the respective anode and cathode and specifically the tapped holes in each of them and maintained in place by a threaded fastener 32. Because both lead and copper are soft metals, it is easy to over tighten the fasteners 32 and strip the threads in the holes 16 and 26 of the positive and negative electrodes 12 and 22, respectively. In addition, because of the various sizes of the batteries 10, straps 30 of different lengths must be available to accommodate the different sized batteries. Where batteries are of different heights, then an accommodation must be made so that the top plates 11 of each of the batteries are substantially coplanar. All of the these problems are avoided by the present invention which is disclosed in FIGS. 1-4.

A coupler 50 includes a pair of clamps 60 connected by a copper mesh 55. The copper mesh 55 is provided at the ends thereof with a end plate 56 and a end plate 57, each being apertured to receive a fastener 58 and 59, respectively. Each of the clamps 60 is provided with a base plate 61 having a curved end 61a, a rear surface 61b and opposed flat sides 61c interconnecting same. The base plate is flat and is provided with a first large aperture 62 toward the front, a portion of which is parallel to the front curved surface 61a, the aperture defining an inner surface 63 of the base plate 61. Intersecting the first aperture 62 is a second aperture 64, for a purpose hereinafter set forth, defining an inner surface 65. The diameter or radius of the aperture 62 is such to fit over one of the lead cylinders 14 or 24 of the positive electrode 12 and negative electrode 22, respectively. The base plate 61 is further provided with a pair of tapped holes 66 on each side of the second aperture 64 and a tapped hole 67 rearwardly of the second aperture 64. An actuator 70 includes a stub shaft 71 which is generally cylindrical having a circular groove 72 therein and a flat 73 positioned in registry with an indicia 76 in the top surface of a hexagonally shaped head member 75.

A spacer block 80 fits intermediate the actuator 70 and the base plate 61 and is in the form of a flat copper plate having a pair of spaced countersunk apertures 81 which may be in registry with the apertures 66 in the base plate and a central aperture 82 which is in registry with the second aperture 64 in the base plate 61 and of a dimension to receive the stub shaft 71 of the actuator 70. On the bottom side of the spacer bar 80 is an indentation or recessed area 83 to accommodate a snap ring 85 used to maintain the actuator 70 in position with respect to the space block 80. After the actuator 70 is mounted onto the spacer block 80 and the snap ring 85 is in place, the spacer block is mounted to the base plate 61 by means of a pair of fasteners 88. After the clamp 60 is thus assembled, two of the clamps are positioned, one at each end of the mesh 55 so that the apertures in each of the end plates 56 and 57 are in registry with the aperture 67 of each of the clamps and a suitable fastener such as 58 and 59 may be used to connect the flexible mesh 55 with each of the clamps 60.

Although copper has been used for the material of choice for both the clamp 60 and the mesh 55, as well as the end plates 56 and 57, it will be understood that various copper alloys which are good conductors as well as silver or silver alloys which are also good electrical conductors may be used. Preferably, the actuator 70 which serves as a locking member is of a harder metal such as steel, preferably stainless steel, in order to prevent corrosion because many of these devices 50 are exposed to the elements. Similarly, the screws 88 are also stainless steel.

In use, when the flat 73 of the stub shaft 71 is in alignment with the inner surface 63 of the first aperture 62 as indicated by the indicia 76, the clamp 60 is easily inserted onto or removed from one of the electrodes 12 or 22. When the clamp 60 is positioned on the associated electrode and the actuator 70 rotated, the circular portion of the stub shaft comes into contact with the lead collar or annular lead cylinder 14 or 24 thereby forcing the copper base plate 61 into close contact with the lead collar or cylinder 14 or 24 establishing a good electrical connection. When the other clamp 60 of the coupler 50 is also so positioned, adjacent battery cells 10 may be connected in series. Thereafter, the batteries 10 may be charged by a solar device or by a generator device, as is well known in the art.

While there has been disclosed what is considered to be the preferred embodiment of the present invention, it is understood that various changes in the details may be made without departing from the spirit, or sacrificing any of the advantages of the present invention.

I claim:

1. A quick connect/disconnect coupler for dry cell batteries comprising a flexible strap having quick connect/disconnect clamps at either end thereof, each clamp including an end piece with a circular aperture therein defining an inner surface complementary in shape to an electrode post of a dry cell battery, a locking member cooperating with each of said end pieces rotatable between an unlocked position wherein said end piece easily slips onto and off of the associated electrode post and a locked position wherein the associated end piece is frictionally engaged with the associated electrode, wherein rotation between the locked and unlocked position is accomplished by rotation of said locking member through an angle of less than 360°, whereby when both end pieces of said coupler are locked on electrodes of different polarity the dry cells are connected in series in condition to be charged.

2. The coupler of claim 1, wherein each of said end pieces is copper or an alloy thereof or silver or an alloy thereof.

3. The coupler of claim 2, wherein said flexible strap is a mesh of copper or an alloy thereof.

4. The coupler of claim 2, wherein said flexible strap is a mesh of silver or an alloy thereof.

5. The coupler of claim 2, wherein each of said locking members is steel.

6. A quick connect disconnect coupler for dry cell batteries comprising a flexible strap having quick connect/disconnect clamps at either end thereof, each clamp including an end piece with a circular aperture therein defining an inner surface complementary in shape to an electrode post of a dry cell batter, a locking member cooperating with each of said end pieces shiftable between an unlocked position wherein said end piece easily slips onto and off of the associated electrode post and a locked position wherein the associated end piece is frictionally engaged with the associated electrode, wherein each of said locking members is rotatable about an axis of rotation parallel to the center axis of the associated circular aperture in said end piece, whereby when both end pieces of said coupler ar locked on electrodes of different polarity the dry cells are connected in series in condition to be charged.

7. The coupler of claim 6, wherein each of said locking members has a portion thereof which upon rotation extends into the associated circular aperture in said end piece frictionally contacting the electrode post positioned therewithin to force the electrode post against said end piece.

8. A quick connect/disconnect coupler for dry cell batteries comprising a flexible metal strap of copper, silver or alloys thereof having quick connect/disconnect clamps at either end thereof, each clamp including a base plate having a first aperture therein defining an inner surface complementary in shape to an electrode post of a dry cell battery and a second aperture intersecting the first aperture, a cylindrical stub shaft rotatably mounted with respect to said base plate extending into said second aperture, said stub shaft having a flat which when aligned with said inner surface of said first aperture permits said clamp to be easily slipped onto or off of an electrode post of the associated dry cell battery, when said stub shaft flat is out of alignment with said inner surface of said first aperture said stub shaft contacts the electrode post and forces same into contact with the inner surface of said first aperture to establish good electrical contact between said clamp and the associated electrode, whereby said coupler may be used rapidly to establish series connection between dry cell batteries of various sizes.

9. The quick connect/disconnect coupler of claim 8, wherein said stub shaft is steel.

10. The quick connect/disconnect coupler of claim 8, wherein each of said end pieces is copper or an alloy thereof or silver or an alloy thereof.

11. The quick connect/disconnect coupler of claim 10, wherein said flexible strap is a mesh of copper or an alloy thereof.

12. The quick connect/disconnect coupler of claim 10, wherein said flexible strap is a mesh of silver or an alloy thereof.

13. The quick connect/disconnect of claim 8, wherein said stub shaft has an integral actuator hexagonal in cross-section.

14. The quick connect/disconnect coupler of claim 13, and further including an apertured spacer plate between said stub shaft actuator and said clamp base plate and a retaining member operationally associated with said stub shaft maintaining said stub shaft extending through an aperture in said spacer plate.

15. The quick connect/disconnect coupler of claim 14, wherein said retaining member is a snap ring mounted within a groove in said stub shaft 16. An end clamp comprising a base plate having a first aperture therein defining an inner surface complementary in shape to an electrode of a dry cell battery and a second aperture intersecting the first aperture, a cylindrical stub shaft rotatably mounted with respect to said base plate extending into said second aperture, said stub shaft having a flat which when aligned with said inner surface of said first aperture permits said clamp to be easily slipped onto or off of an electrode post of the associated dry cell battery, when said stub shaft flat is out of alignment with said inner surface of said first aperture said stub shaft contacts the electrode and forces same into contact with the inner surface of said first aperture to establish good electrical contact between said clamp and the associated electrode.

17. The end clamp of claim 16, wherein said end piece is copper or an alloy thereof or silver or an alloy thereof.

18. The end clamp of claim 16, wherein said stub shaft is steel.

19. The end clamp of claim 16, and further including an apertured spacer plate between said stub shaft actuator and said clamp base plate and a retaining member operationally associated with said stub shaft maintaining said stub shaft extending through an aperture in said spacer plate.

20. The end clamp of claim 16, wherein said retaining member is a snap ring mounted within a groove in said stub shaft.

* * * * *

UNITED STATES PATENT AND TRADEMARK OFFICE
CERTIFICATE OF CORRECTION

PATENT NO. : 5,154,646
DATED : October 13, 1992
INVENTOR(S) : Kenneth E. Shoup

It is certified that error appears in the above-identified patent and that said Letters Patent is hereby corrected as shown below:

Col. 4, claim 6, line 6, "batter" should be --battery--.

Col. 4, claim 6, line 15, "ar" should be --are--.

Signed and Sealed this

Fifth Day of October, 1993

Attest:

BRUCE LEHMAN

Attesting Officer    Commissioner of Patents and Trademarks